United States Patent
DeArdo et al.

(10) Patent No.: US 6,351,743 B1
(45) Date of Patent: Feb. 26, 2002

(54) METHOD AND APPARATUS FOR OPERATING DOMAIN NAME SERVERS

(75) Inventors: Carmen Edward DeArdo; Timothy John Larson, both of Pickerington; Gordon Thomas Spencer, Gahanna; Mahesh Kumar Totapally, Reynoldsburg, all of OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/318,908

(22) Filed: May 26, 1999

(51) Int. Cl.[7] .............................................. G06F 17/30
(52) U.S. Cl. ................................ 707/3; 707/5; 707/10; 707/200; 709/203; 709/219; 711/117; 711/118
(58) Field of Search ........................ 707/10, 3, 5, 200; 709/203, 219; 711/118, 117

(56) References Cited

U.S. PATENT DOCUMENTS

| | | | |
|---|---|---|---|
| 5,434,974 A | * 7/1995 | Loucks et al. | 707/101 |
| 5,884,038 A | * 3/1999 | Kapoor | 709/226 |
| 6,014,660 A | * 1/2000 | Lim et al. | 707/3 |
| 6,016,512 A | * 1/2000 | Huitema | 709/245 |
| 6,023,724 A | * 2/2000 | Bhatia et al. | 709/218 |
| 6,028,848 A | * 2/2000 | Bhatia et al. | 370/257 |
| 6,085,234 A | * 7/2000 | Pitts et al. | 709/217 |
| 6,108,330 A | * 8/2000 | Bhatia et al. | 370/352 |

* cited by examiner

*Primary Examiner*—Jack Choules
*Assistant Examiner*—Cheryl Lewis
(74) *Attorney, Agent, or Firm*—Jack R. Penrod

(57) ABSTRACT

A domain name server, DNS, for Internet Protocol or Intranet Protocol networks, that has a non-cached domain name server connected to a cached domain name server, and a query server that is connected to both the non-cached DNS and the cached DNS. The query server balances the query load between the DNSs. The query server compares counts of outstanding queries of each DNS and assigns the next query to the DNS with the fewer outstanding counts, unless the query is a special type known as an authoratative query. All authoratative queries are processed by the non-cached DNS. This is because the DNS information stored in the non-cached server is more carefully updated so its information has a higher level of correctness than the information in the cached DNS. Periodic updating of the non-cached DNS keeps its information at this higher level of correctness. The cached DNS runs a little faster because its domain name information updating is simpler than the non-cached DNS, but the chances for a DNS error or stale node address are higher.

7 Claims, 2 Drawing Sheets

METHOD AND APPARATUS FOR OPERATING DOMAIN NAME SERVERS

TECHNICAL FIELD

The invention relates to internet protocol networks, and more particularly to a method and apparatus for operating domain name servers of such networks.

DESCRIPTION OF THE PRIOR ART

Domain Name Server (DNS) is an essential part of an internet service. The internet uses four part numeric addresses to route and access the various nodes of the internet. The DNS converts an alphanumeric name into a node address. Since a large majority of browsing and accessing is accomplished by using alphanumeric names, each DNS is often heavily used.

There are two types of domain name servers: authoritative and cache-only. The authoritative type uses a data base which the DNS process queries to obtain the four part numeric node address. The cache-only type, as its name implies, does not have a data base, instead it uses a large cache memory. Although prior art systems sometimes used both types of servers, there usually were loading problems which prevented both from operating at high performance levels. Further, the communication from one server to another becomes one of the limiting factors of an arrangement having an authoritative server connected with a cache-only server.

Thus, there is a long felt need in the art for a method for an authoritative domain name server and a cache-only domain name sever which can operate together and share the domain name to four part numeric address load. Furthermore, there is a long felt need for operating an arrangement of an authoritative domain name server and a cache-only domain name server in a way that does not create an excessive amount of server-to-server communications traffic.

SUMMARY OF THE INVENTION

Briefly stated in accordance with one aspect of the invention the aforementioned needs are addressed and a technical advance obtained by providing a domain name server, DNS, which includes a named domain name server and a cached domain name server. The DNS also includes a query server that is connected to the named domain name server and the cache domain name server. The query server distributes incoming domain name server queries among both of the domain name servers.

In accordance with another aspect of the invention, the aforementioned needs are addressed and a technical advance obtained by providing a method for operating a domain name server, DNS, having a named server and a cached server. This method includes the step of: a. receiving a query. Next, the method processes the non-authoratative queries by the steps: b. determining if the received query is authoratative, if it is authoratative, jumping to step h; c. determining if the outstanding named query count is greater than the outstanding cached query count, if the outstanding named query count is not greater, jumping to step h; d. sending the non-authoratative query to a cached server process; e. incrementing a cached query received count; f. processing the query; g. incrementing a cached queries processed count and returning to step a. to receive and process the next non-authoratative query. The method process the authoratative queries by the steps of: h. sending the authoratative query to named server process; i. incrementing a named query received count; j. processing the query; and k. incrementing a named queries processed count and returning to step a. to receive the next query.

DETAILED DESCRIPTION

Figure 1:
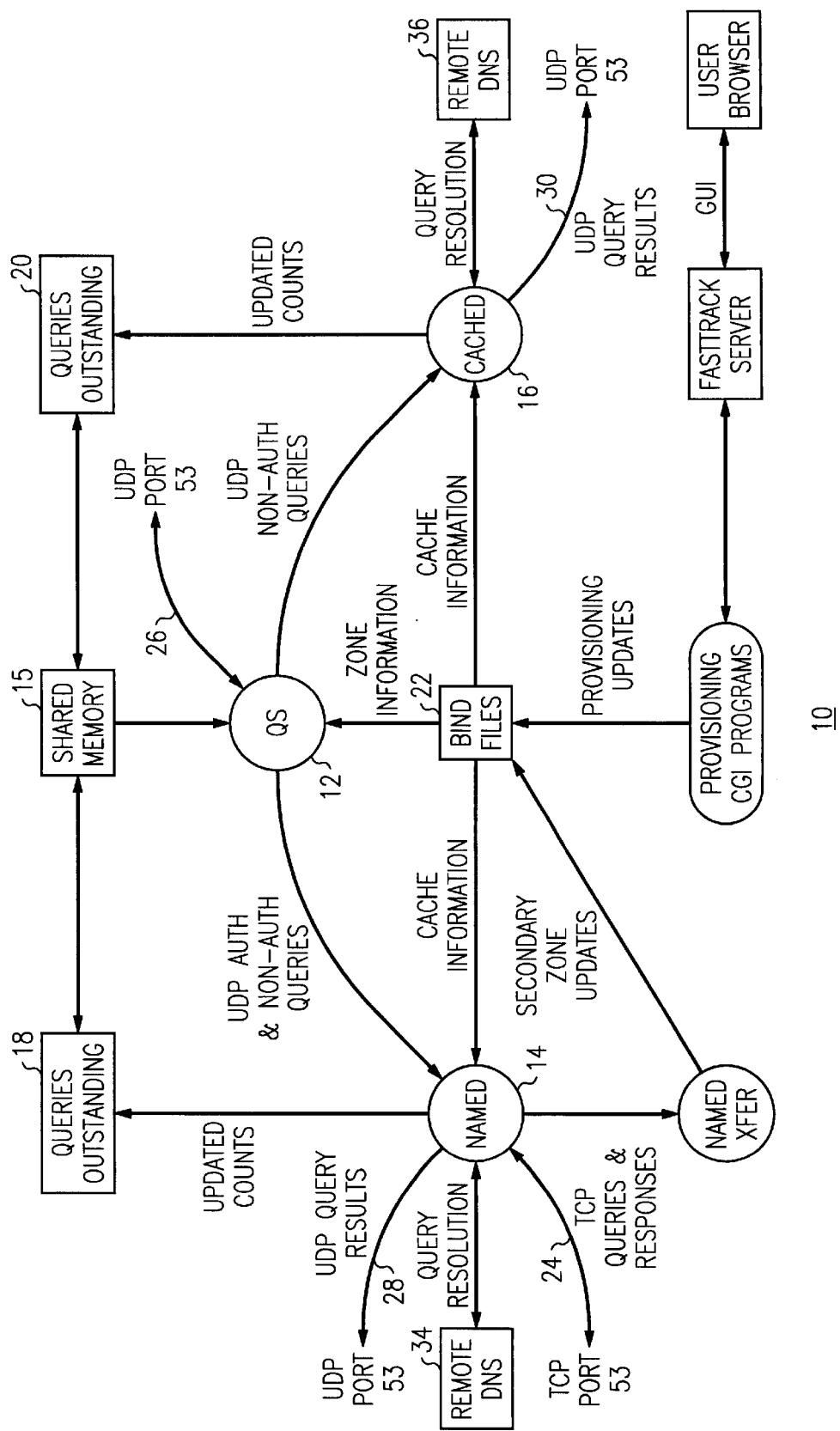
FIG. 1 is a simplified block diagram illustrating an arrangement for a domain name server according to one aspect of the invention.

Referring to FIG. 1, a domain name server (DNS) 10 is shown. The DNS 10 takes an alphanumeric name and finds a corresponding four part node address for it. The finding a corresponding four part node number address can be structured as a query operation, that is why part of the DNS 10 is a query server 12. Query server 12 is connected to named server 14 and cached server 16. It should be noted that named server 14 and cached server 16 are "virtual" in that they are not separate entities, rather they are both located within DNS 10. Servers 14 and 16 may be located within a multiprocessor workstation or sinilar system. One contemplated embodiment uses a Sparc 20 symmetric multiprocessor system running the Solaris® operating system by SUN Microsystems.

As will be explained later, there are some queries that must be sent to named server 14 because only the named server 14 operates on those specific queries. Most queries, however, may be sent to either named server 14 or cached server 16. For the queries that may be answered by either named server 14 or cached server 16, named server counter 18 and cached server counter 20 keep short term running counts of the number of outstanding queries for the named server 14 and the cached server 16, respectively. Query server 12 uses the counts from counters 18, 20 to determine where to send the next query that may be sent to either named server 14 or cached server 16. By keeping the counts of counters 18, 20 close to each other, query server 12 balances the query load between servers 14, 16 which yeilds the advantage of increased efficiency of DNS 10.

Servers 14 and 16 are connected to Berkeley Internet Name Domain (BIND) file server 22. BIND file server 22 conforms to the BIND 8.1 feature set, which includes a dynamic update capability. BIND file server 22 updates the databases of servers 14 and 16. A flat data file is used by servers 14 and 16, respectively. Flat data files were found to speed up query responses over structured database type files.

The query server 12 is connected to port 53 by which the query server 12 receives all universal data protocol queries that are sent to system 10. If a query is potentially authoritative, i.e. if the query calls for a translation of x.y.z, where the DNS is authoritative for some zone in the hierarchy such as x.y.z, y.z or z, that query will be sent to the primary named server 14. If the query does not call for an authoritative response, the query is a candidate to be sent either the named server 14 or the cache server 16 depending on outstanding query status as recorded by counters 18, 20 and a load balancing process.

The load balancing process uses the number of outstanding queries from counters 18 and 20. These counts are stored in shared memory 15. The shared memory 15 is written to by both the primary named server 14 and the cached server 16. The shared memory 15 is also written to by the handler (described below) when a zeroing of the counts occurs. The shared memory 15 is read by the query server 12. Zone transfers are sent to the primary named server 14. Zone transfers cause a separate process to be created to handle the transfer of zone information.

In operation of the system 10, all transfer control packet (TCP) traffic is sent directly to named server via TCP port 53. via line 24. Since such TCP traffic is typically a small percentage of the overall traffic, it is possible for query server 12 to direct universal data protocol (UDP) traffic to ensure that the total traffic is as balanced as possible between the severs 14 and 16. This is accomplished by adding the outstanding number of TCPqueries for named server 14 to its overall count. The query server 12 and a query server process performed thereby, then sends the next non-authoritative UDP query to whichever server 14 or 16 that has the fewer number of outstanding queries as indicated by queries outstanding counts 18 and 20.

For the case of a request for non-authorative data that is not cached or for data whose time to live (TTL) has expired.,the named server 14 is required to query a remote DNS system 34 according to its cache hints file in order to resolve these types of queries. These types of requests are are performed independently of any query server process on any other UDP port, e.g. 'UDP Port 53' 30. Upon receiving an answer from the remote system 34 the response is sent to the requester using UDP Port 53 24 (or TCP if it was a TCP message).

A load balancing method 200 is within query server 12. This method 200 tests and sends a next non-authoritative query to the server 14, 16 that has a smaller difference between received UDP queries and processed UDP queries. The load balancing method uses the four load balancing counts that are stored in shared memory 15. These four counts consist of two counts for each of the two servers 14, 16. The first count of each server 14, 16 is the number of UDP queries received. This first count is incremented for its respective server 14 or 16 by the query server 12 when a query is sent to that server. The second count of each server is the number of UDP queries processed. Each second count is incremented by its respective server 14 or 16 when that server finishes processing of a query.

Figure 2:
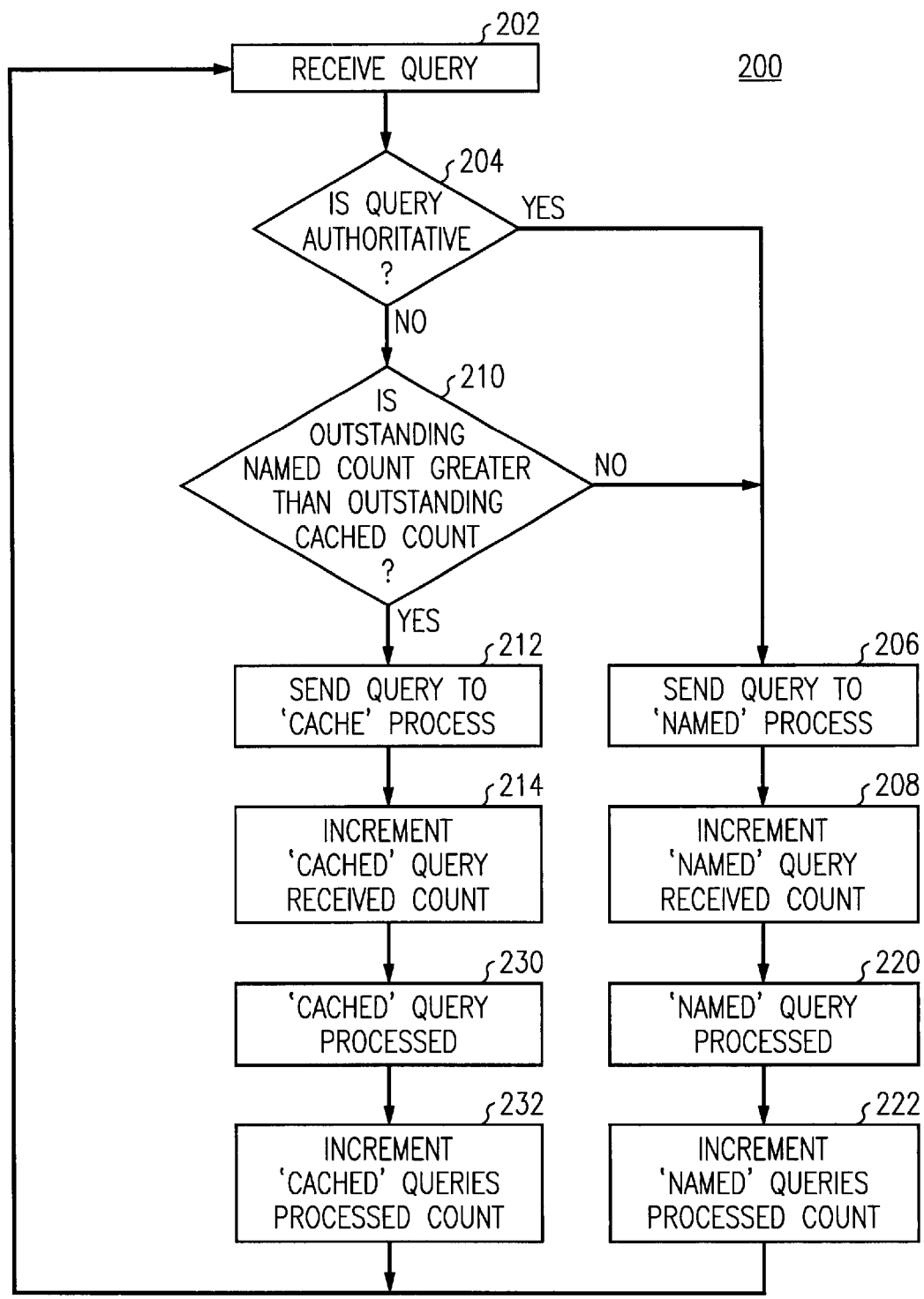
FIG. 2 is a flow diagram of a load sharing process for use in the arrangement of FIG. 1.

Load balancing method 200 is shown in FIG. 2. Method 200 starts with the step 202 where each query request is received. A query request to the servers 14, 16 is usually in the form of URL name with domain, and the desired response to each query is a numerical node address as quickly as possible. After each query request is received, decision step 204 checks to determine what type of query request it is. Authoratative query requests, i.e.those query requests that are expected to be answered with auhoritative data, are sent to the named server 14. So, decision step 204 directs authoratative queries via step 206 to a process of named server 14. Step 206 executes the actual sending of each query to a process of named server 14. Decision step 204 directs non-authoratative query requests, i.e. query requests that can be processed by either named server 14 or cached server 16, to decision step 210. Decision step 210 determines if the outstanding query count for the named server 14 is greater than the outstanding query count for the cached server 16. If the decision is NO, then the named server 14 has the lighter query load and the method progresses to step 206. As detailed above, step 206 sends each query it receives a process of named server 14. This particular query that came from step 210 is non-authoratative but it will be processed by the named server 14 for server load balancing purposes. As before, step 206 executes the actual sending of each query to a process of named server 14. If, on the other hand, the decision at step 210 is YES, then the cached server 16 has the lighter query load and the method progresses to step 212. Step 212 sends the query to cached process 16. This is the most of the non-authoratative queries will be directed by method 200 the rest of the non-authoratative queries being directed by step 206 for load balancing.

After step 212, method 200 progresses to step 214. At step 214 the cached query received count is incremented. At this point there is some time delay as the query is processed by the cached server16. Cached server 16 then processes the query request at step 230. When the cached server 16 has completed processing the query, cached server 16 sends the query result to the query originator and also sends the method 200 to step 232. At step 232, the cached queries processed count is incremented. The number of outstanding queries for the cached server can be determined by subtracting the cached queries processed count from the cached queries received count. At this point, the method returns to step 202 to receive a next query.

Similarly for the named server 14, after step 206, method 200 progresses to step 208. At step 208 the named query received count is incremented. At this point there is some time delay as the query is processed by the named server 14. Named server 14 then processes the query request at step 220. When the named server 14 has completed processing the query, named server 14 sends the query result to the query originator and also sends the method 200 to step 222. At step 232, the named queries processed count is incremented. The number of outstanding queries for the named server can be determined by subtracting the named queries processed count from the named queries received count. At this point, the method returns to step 202 to receive a next query.

In a preferred embodiment, method 200 only uses the counts of UDP queries. That means that the authoratative and TCP queries are not counted for method 200 load balancing purposes. But, if the named server 14 has a significant amount of authoratative and TCP queries, the number of UDP queries will start to back up resulting in more of the UDP queries being processed by the cached server 16. However as long as the TCP and authoratative UDP query traffic is 50% or less, a balance between the process of named server 14 and the process of the cached server 16 can be achieved, and query performance can approach a doubling (a naural limit for two servers). As, however, the authoratative query traffic reaches 100% of the load, then only the named server will be 100% utilized and the cached server will be 0% utilized, the worst query traffic case.

A handler for method 200 runs periodically, such as every 15 minutes, and zeroes all of the counts. Since one of the servers 14, 16 may be handling a query at the time the counts are zeroed, a check is provided in the server logic (not shown). This logic ensures that when a UDP message is processed the UDP processed count is not greater than its respective UDP queries received count value. If any UDP processed count is greater than its respective UDP queries received count value, then the UDP processed count is set to the UDP queries received count value. This simple logic corrects for the case where contention has occurred and caused the counts to be incorrect due to the server and method 200 handler updating the processed counts at the same time (because they are running on different processors).

The periodic resetting of counts serves multiple purposes. It avoids counters wrapping around and also factors out old data in terms of lost or unprocessed queries to ensure the method 200 is operating off of an up to date view of each server's status. Additionally, any large difference in a server's processed and received query counts just before zeroing those counts. Large differences may be a sign of trouble with that respective server.

Thus, it will now be understood that there has been described a new domain name server, DNS. Those of average skill in the art will appreciate that variations and modifications may be made to the disclosed invention. For example, the primary named server 14 may have a back-up, secondary named server (not shown) which is essentialily identical with the primary named server 14. Similarly, the cached server 16 may have one or more back-up servers (not shown) which are essentially identical to cached server 16. Furthermore, the method 200 may process more than one query at a time using pipelining techneques. It is intended that the invention shall include all such variations and modifications that do not exceed the spirit and scope of the attached claims.

What is claimed is:

1. A method for operating a DNS having a named server and a cached server, said method comprising the steps of:
   a. receiving a query;
   b. determining if the received query is authoratative, if it is authoratative, jumping to step h;
   c. determining if the outstanding named query count is greater than the outstanding cached query count, if the outstanding named query count is not greater, jumping to step h;
   d. sending the non-authoratative query to a cached server process;
   e. incrementing a cached query received count;
   f. processing the query;
   g. incrementing a cached queries processed count and returning to step a. to receive the next query;
   h. sending the non-authoratative query to named server process;
   i. incrementing a named query received count;
   j. processing the query; and
   k. incrementing a named queries processed count and returning to step a. to receiving the next query.

2. The method of claim 1, wherein the non-authoratative queries are processed in pipeline fashion where a query does not have to have completed processing before a subsequent query can be received and processed to completion.

3. A domain name server, DNS, comprising:
   a named domain name server;
   a cached domain name server;
   a memory connected to and shared by said named domain name server and said cached domain name server for storing data of outstanding queries for said name servers;
   a query server connected to said named domain name server, said cached domain name server and said memory that distributes incoming domain name server queries among said domain name servers according to said data of outstanding queries in said memory.

4. The DNS according to claim 3, wherein said query server directs authoritative queries to said named server.

5. The DNS according to claim 4, wherein said query server distributes non-authoritative queries between said named domain name server and said cached domain name server.

6. The DNS according to claim 4, wherein said query server distributes non-authoritative queries between said named domain name server and said cached domain name server by sending each non-authoritative query to the domain name server having a lesser number of outstanding queries.

7. A domain name server, DNS, comprising:
   a named domain name server;
   a cached domain name server; and
   a query server connected to said named domain name server queries and said cached domain name server that distributes incoming domain name server queries among said domain name servers;
   wherein said query server directs authoritative queries to said named domain name server; and
   wherein said query server distributes non-authoritative queries between said named domain name server and said cached domain name server by sending each non-authoritative query to the domain name server having a lesser number of outstanding queries.

* * * * *